Feb. 8, 1938.   G. MARSDEN   2,107,674
CHANGING DISPLAY WEIGHING MACHINE
Filed Feb. 12, 1937
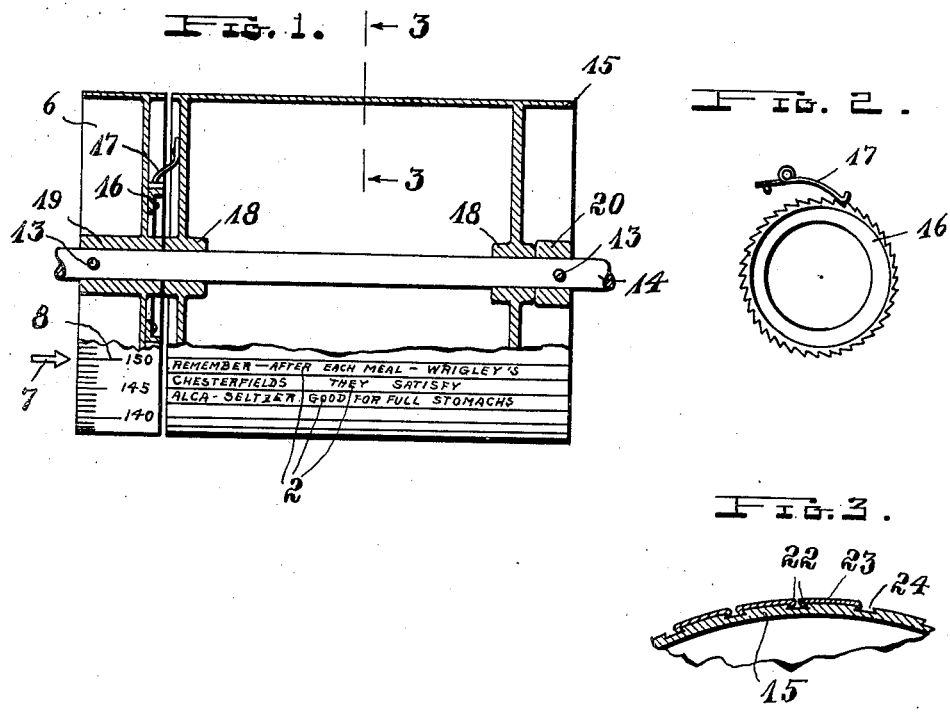
INVENTOR:
GEORGE MARSDEN, Patented Feb. 8, 1938

2,107,674

UNITED STATES PATENT OFFICE 2,107,674

CHANGING DISPLAY WEIGHING MACHINE

George Marsden, Los Angeles, Calif.

Application February 12, 1937, Serial No. 125,387

2 Claims. (Cl. 40—28)

This invention relates to machines indicating the weight of a person stepping on the platform of the machines and at the same time aligning some display matter on a movable face.

One of the objects of this invention is to operatively combine a weight indicator with a display indicator.

Another object is to provide means whereby the display indicator is moved to a different position upon any actuating of the weight indicator.

Another object is to provide means whereby the display indicator can move freely regardless of any movement of the weight indicator.

Another object is to provide means whereby the weight indicator may move in one direction without actuating the display indicator.

Another object is to provide means whereby display matter may be exchanged.

Other objects will appear from the following description and appended claims as well as from the accompanying drawing, in which—

Fig. 1 is a fragmentary longitudinal mid-sectional view partly in side elevation of a weight-indicating drum and a co-operatively mounted display drum.

Fig. 2 is a detail end elevation of ratchet rim and pawl; and

Fig. 3 is a fragmentary enlarged cross-section on line 3—3 of Fig. 1.

Since the actuating mechanisms of any scale or weighing machine have no material bearing on the particular parts involved in this invention, and since there are so many different types of mechanisms that could not possibly all be shown here, but any one of which could be suitable for actuating the parts to which this invention relates, it is deemed best not to show any mechanism but merely relying on the fact that the indicating part is moved in some manner in any scale or weighing machine.

Thus, it is a well known fact that a weight-indicating drum of the type indicated at 6 in Fig. 1 is rotated in some manner whenever the weighing machine or scale of which such a drum is a part is used, the rotation being more or less so as to bring the weight-indicating figure to a point near the indicating point, such as the arrow 7, in the illustration "150" being the weight-indicating figure designated at 8 to so align with the arrow.

The drum 6 of the weight-indicator form illustrated in Fig. 1, is securely mounted in any suitable manner, as by means of a pin indicated at 13, on an actuating shaft 14.

Such a shaft may be actuated, as stated in the beginning, by any mechanism of any of the many different types of weighing machines or scales, to result in a weight-indicating movement of the drum 6.

The principal feature of this invention, involving the indicator, is mounted in operative relation on this shaft to cooperate with the weight-indicating means.

With the drum-type weight-indicator of Fig. 1, for instance, a drum 15 is mounted on the shaft 14 in operative relation to the weight-indicating drum 6. A lightly operating ratchet device is interposed between the two drums, the ratchet ring 16 being secured to one drum and the spring 17 being secured to the other drum.

Though the spring may appear comparatively strong, it should be understood that this spring is preferably suitably fine and light, to result in a ready slipping, in fact, rather in a so to say loose-play engagement, whereby the display drum 15 may continue to rotate even after the weight-indicating drum has come to a stop. At least, the spring should be light enough to slip over the ratchet wheel during the return movement of the weight-indicating drum in such a manner as to leave the display drum 15 unaffected.

Any of the supporting hubs of the advertising drum 15, indicated at 18, is therefore designed to turn freely on the shaft 14, the advertising drum 15 being mounted between the securely mounted hub 19 of the weight-indicating drum 6 and a collar 20.

Such a freely rotating drum 15 is provided with means, such as illustrated in Fig. 3, whereby display matter, such as indicated at 21 in Fig. 1, may be applied to the surface of the drum 15 exchangeably.

Due to the free rotating of the drum 15, any of the display matter may therefore appear adjacent and aligned to any weight-indicating figure of the drum 6, so that, though the same weight may be indicated repeatedly by the weight-indicating drum 6, almost any display matter may eventually appear displayed most favorably on the display drum 15 and so as to appear aligned with respect to the indicated weight.

For holding the advertising matter exchangeably on the surface of the drum 15, various well-known means may, of course be used, a simple means having been illustrated in Fig. 3, the bent edges 22 of the display matter carrying slips 23 simply engage in the dovetailed grooves 24, so that any slip with any different display matter may be inserted at any desired or suitable line of the drum 15.

I claim:

1. In a weighing machine having a drum dial with weight-indicating graduations, a display device of a drum form cooperatively disposed to and having its periphery aligning with the dial drum, display matter on the display drum arranged to appear as linear continuations of the dial graduations, and a slip contact means between the dial drum and the display drum for actuating the display drum by movements of the dial drum to bring different matter into aligned display position with respect to any of the weight-indicating figures of the dial-drum.

2. In a weighing machine having a drum dial with weight-indicating graduations, a display device of a drum form cooperatively disposed to and having its periphery aligning with the dial drum, display matter on the display drum arranged to appear as linear continuations of the dial graduations, a slip contact means interposed between the dial drum and the display drum for actuating the display drum by movements of the dial drum so as to bring different matter into aligned display position with respect to any of the weight-indicating figures of the dial drum, and means on the display drum for exchangeably holding different display matter.

GEORGE MARSDEN.